Figure 1:
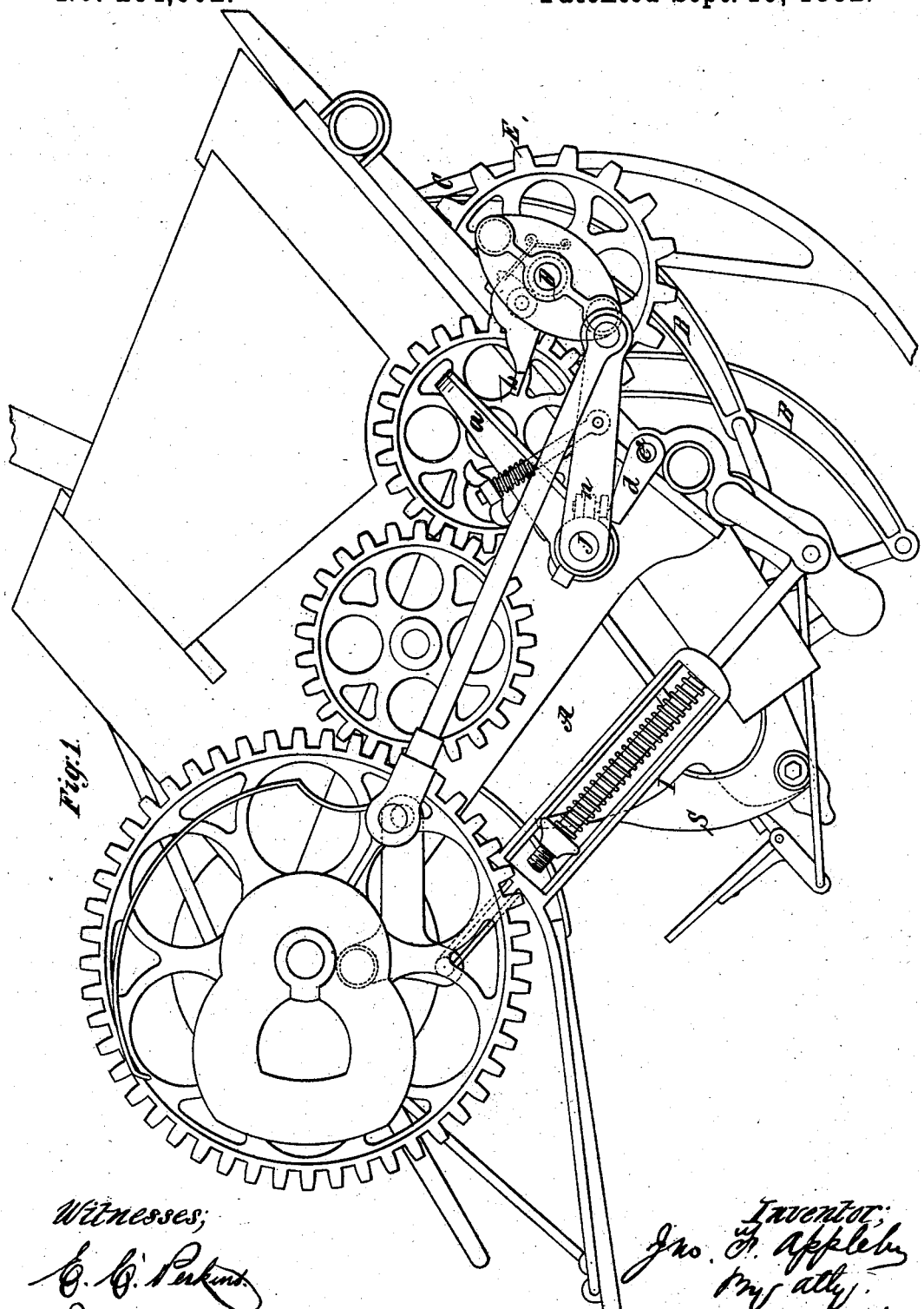

(No Model.)

5 Sheets—Sheet 3.

J. F. APPLEBY.
GRAIN BINDER.

No. 264,602. Patented Sept. 19, 1882.

Witnesses;
E. C. Perkins
Jacob Felbel

Inventor:
Jno. F. Appleby
By atty.
J. N. McIntire (No Model.)  J. F. APPLEBY.  5 Sheets—Sheet 5.
GRAIN BINDER.

No. 264,602.  Patented Sept. 19, 1882.

Witnesses:
C. C. Perkins
Jacob Felbel

Inventor:
Jno. F. Appleby
by atty.
J. N. McIntire

UNITED STATES PATENT OFFICE.

JOHN F. APPLEBY, OF MINNEAPOLIS, MINNESOTA, ASSIGNOR TO THE MINNEAPOLIS HARVESTER WORKS, OF MINNESOTA.

GRAIN-BINDER.

SPECIFICATION forming part of Letters Patent No. 264,602, dated September 19, 1882.

Application filed December 8, 1881. (No model.)

*To all whom it may concern:*

Be it known that I, JOHN F. APPLEBY, of Minneapolis, in the county of Hennepin and State of Minnesota, have invented certain new and useful Improvements in Grain-Binders; and I do hereby declare that the following is a full, clear, and exact description thereof, reference being had to the accompanying drawings, making part of this application.

My invention relates to an improvement in that kind or type of self-binders in which the continuously-running mechanism that drives the needle-arm and other devices for binding into a sheaf the collected gavel is periodically thrown into gear with said devices through the medium of some device actuated by the pressure on it of the grain which is being collected or gathered within and packed in the gavel-receptacle.

In mechanisms of this type as made previous to my invention it has been customary to have the device, which is actuated by the pressure on it of the grain packed into the gavel-receptacle, located at or near the lower part of said receptacle, or, in other words, near that end of the gavel-receptacle at which the bound sheaf makes its exit from said receptacle. In machines constructed upon this principle there is a liability (in the cutting and binding of some kinds of grain) of the grain collecting and being packed in the gavel-receptacle to an extent beyond that contemplated or designed, whereby, instead of the device for actuating the tripping mechanism acting at the proper time, it is not actuated until a too great collection of grain has been effected, and thus an unusual and unnecessary strain is brought on the binding devices, and a too large sheaf is formed. There is also a liability in machines organized on this principle of an utter clogging and stoppage of the machine by reason of some kinds of materials—such as sticky wet grain—getting wedged into the gavel-receptacle in such a manner as to fail to get packed down against the actuating device so as to move it, and thus set the binder devices properly into motion.

My invention has for its object to entirely overcome these defects of the type of self-binders referred to; and to this main end and object my invention consists in the employment of one or more of the packing-arms, or some other device operating to press the grain toward the discharge end of the gavel-receptacle (instead of a device located at or near the discharge end thereof) for the purpose of transmitting the pressure applied to force the grain into the gavel-receptacle to the tripping mechanism for throwing the driving mechanism of the binder into gear with the needle-arm and other devices for binding the sheaf, and thus operating said devices at the proper times, all as will be hereinafter more fully explained.

To enable those skilled in the art to which my said improvement relates to make and use my invention, I will now proceed to more fully explain it, referring by letters to the accompanying drawings, forming part of this specification.

Figure 2:
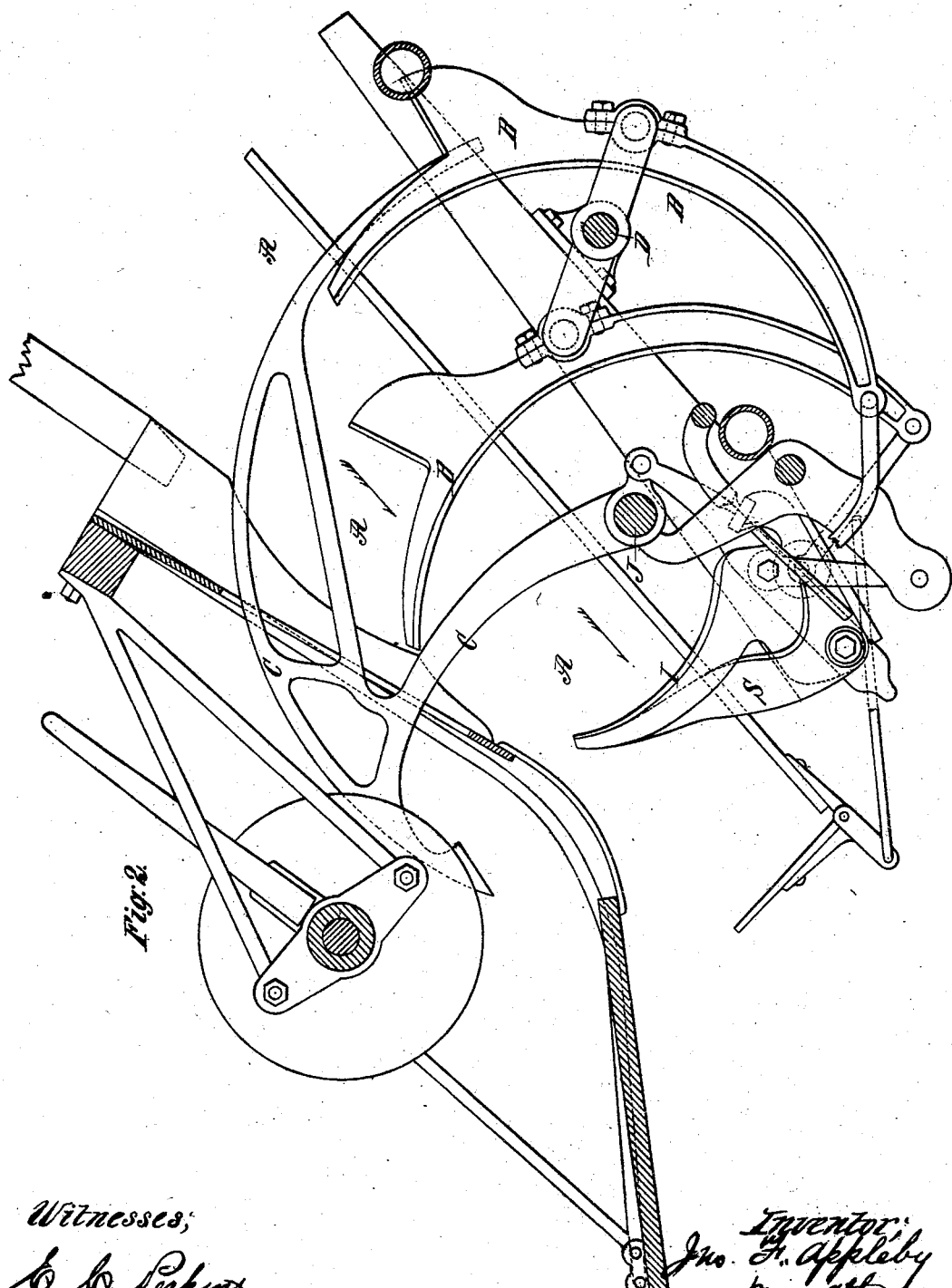
Figure 3:
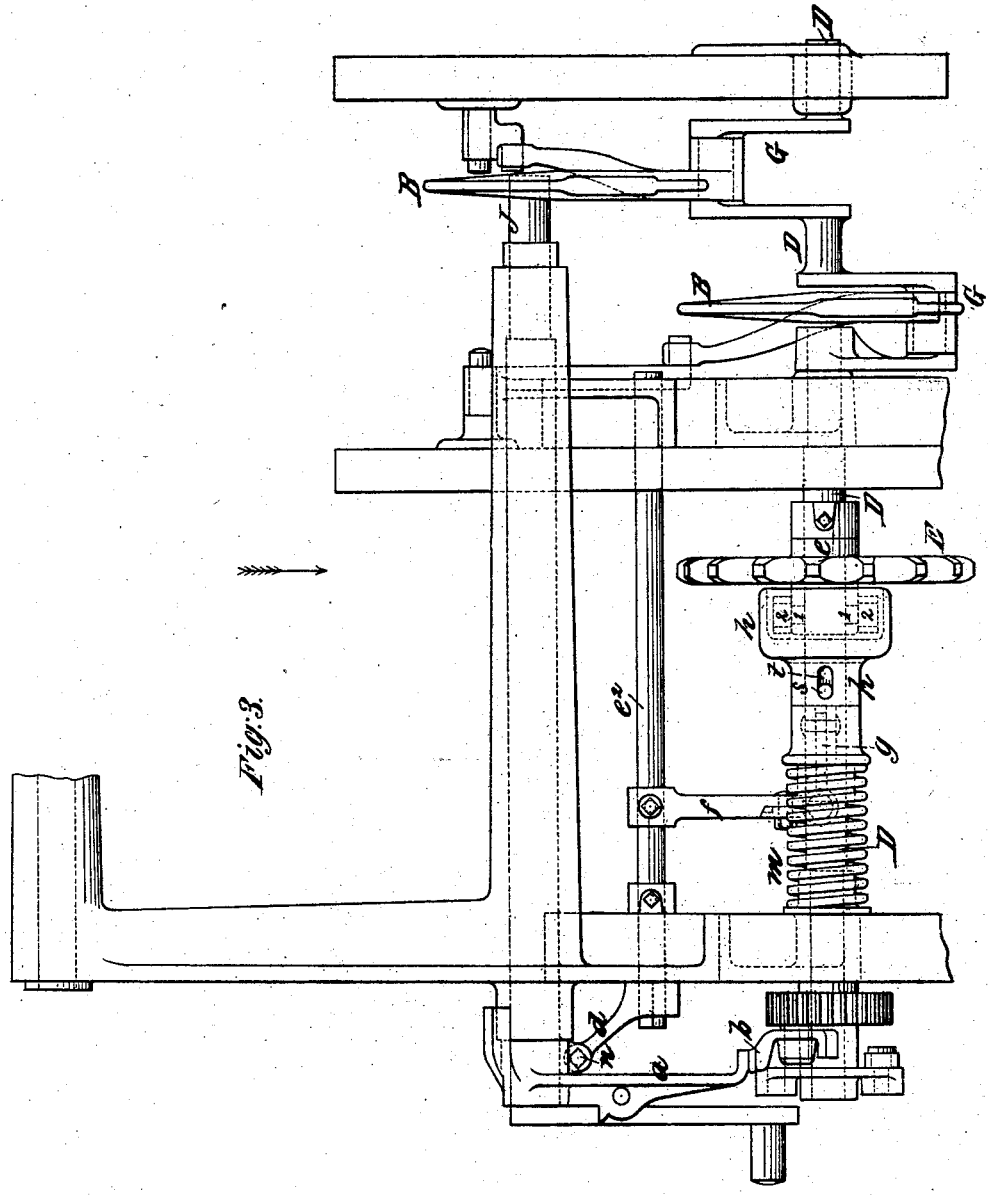
Figure 4:
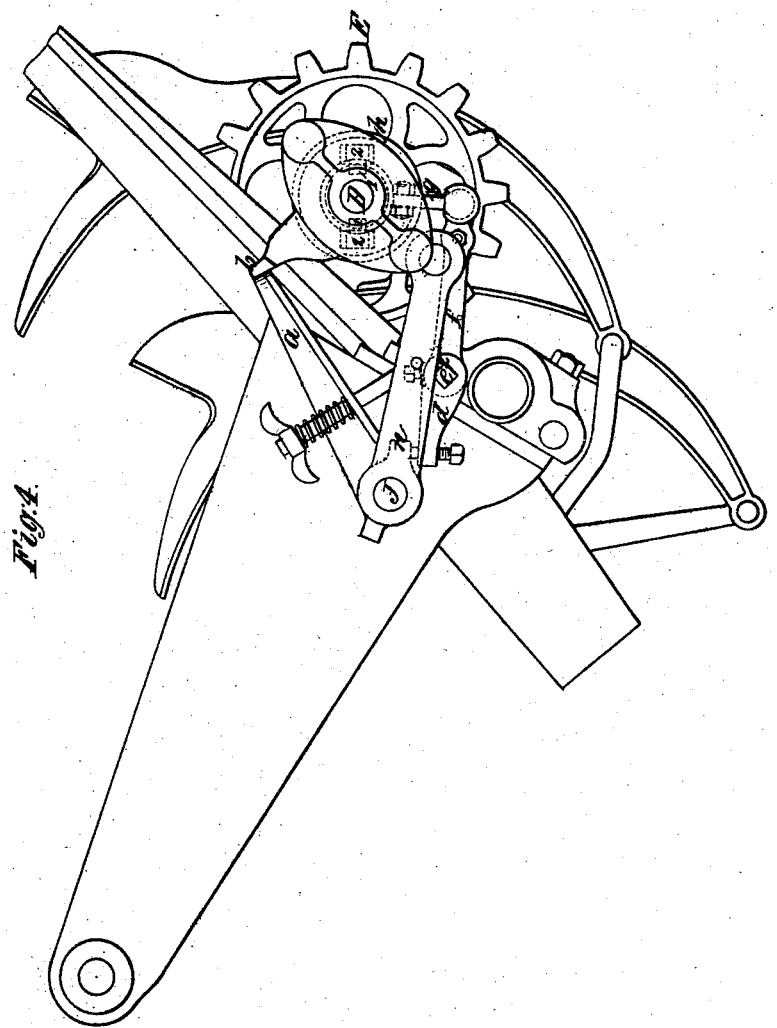
Figure 5:
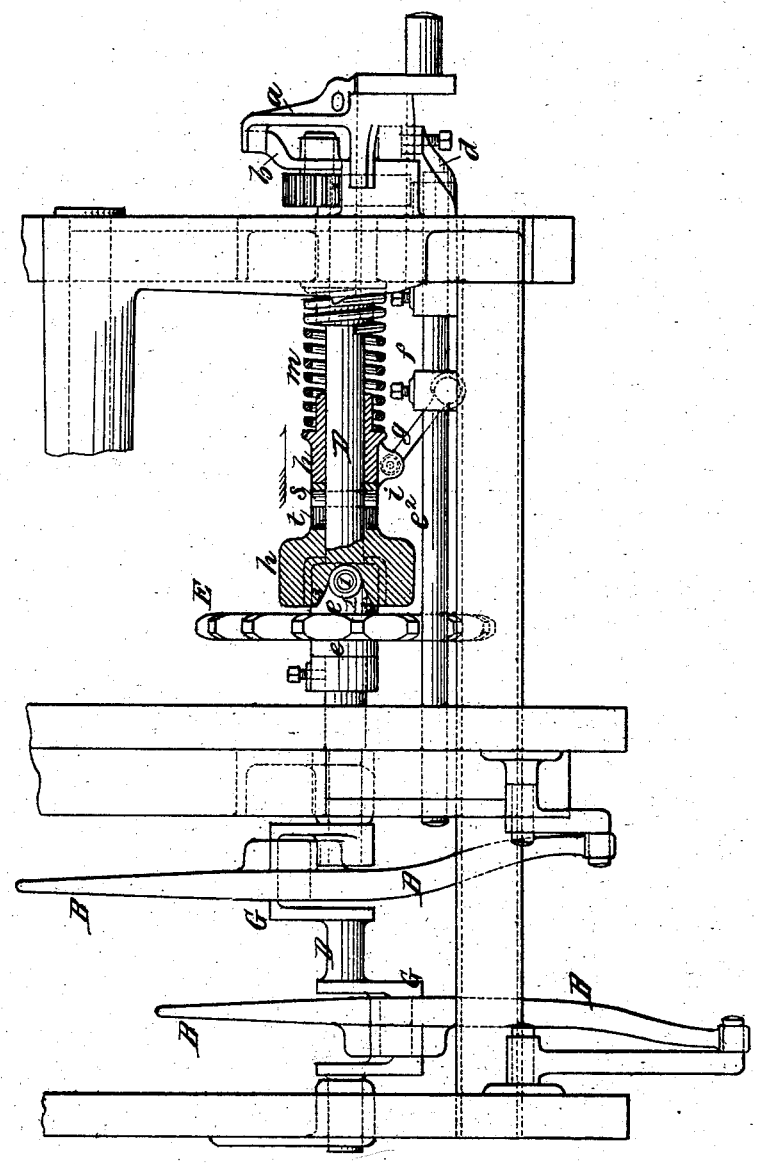

As my present invention relates wholly to the novel contrivance or means for tripping into gear with the driving mechanism, or for properly starting into action at the right times the binder devices, I need show and specially explain only those parts of a binder which are associated with the contrivance alluded to; and as I have in practice applied my present invention (by a slight alteration of the machine) to a self-binder—such as shown and described in general in my United States Letters Patent, No. 212,420, February 18, 1879, and with some improvements in another application filed by me June 29, 1881, and now pending in the Patent Office—I have shown at Figures 1 and 2, respectively, a side view and a vertical section of the binder attachment for harvesters shown and described in my said other application, while at Fig. 3 I have shown a partial top view of said binder with my present improvement applied thereto; at Fig. 4, a partial side view of the improved contrivance seen at Fig. 3; and at Fig. 5, a view of the same, looking in the direction of the arrow at Fig. 3.

In the several figures the same part will be found designated by the same reference-letter.

A (see Figs. 2 and 1) is the gavel-receptacle, into which the grain descends in the direction indicated by the arrows at Fig. 2, and within which it is packed by the packers until a sufficient quantity shall have been forced down toward and against the fingers I to form a sheaf, when the needle-arm C carries the binding-cord partially around the gavel, at the same time (in conjunction with the compressing-fingers I) compressing the gavel, while the tying mechanism ties up the gavel into a sheaf, and the latter is discharged from the machine in a manner which is well known, and which, in view of my patent and other application, does not need further explanation here.

D is the main driving and continuously-rotating shaft of the binder mechanism, and is rotated by a sprocket-wheel, E, arranged thereon, and belted by a chain-belt to a main driving-wheel and shaft of the harvester. The said shaft D is provided with the cranks G G, that drive the packers B B in the manner shown and described in my other application, above alluded to, and the chain-wheel E has its hub $e$ mounted to turn freely on said shaft, but clutched to a sleeve-piece, $h$, which, though capable of a slight sliding movement lengthwise of shaft D, cannot turn thereon, and thus through the medium of said sleeve-piece $h$ the chain-wheel E drives the shaft D.

$a$ is the trip lever or arm, which has to be slightly lifted at its upper or free end in order to liberate the spring-dog $b$, that rests on the said end of said lever $a$, for the purpose of throwing the drive-pinion of shaft D into gear with the train of spur-wheels that operate the devices for binding and tying up and discharging the sheaf. The relative positions of the parts $a$ and $b$ seen at Fig. 4 are those occupied while the shaft runs without driving the binder devices proper; and those seen at Fig. 1 are the positions of these parts after the tripping and while the mechanism is all running, as will be understood without further explanation here.

In my former machine, as patented, this lever $a$ was vibrated about its axis or shaft J through the medium of an arm, $d$, (see Fig. 1,) fast on a rock-shaft, $e^2$, that was slightly turned by a rod and lever connected to the compressor-fingers I; while in said former machine, as improved according to my pending application, the rock-shaft $e^2$ is moved or actuated from an auxiliary finger, S, (see Figs. 1 and 2;) but according to my present improvement I dispense simply with all connection between the rock-shaft $e^2$ and any device located near the discharge end of the gavel-receptacle, and operate the said shaft $e^2$ from the sleeve-piece $h$ or shaft D in the following manner.

From the shaft $e^2$ extends an arm, $f$, rigidly secured at one end to said shaft; and to the outer end of said arm $f$ is pivotally connected (see Figs. 3 and 5) one end of a short pitman, $g$, the other end of which is pivoted to the projecting ear-like portions $i$ of the sleeve $h$, so that any longitudinal movement of said sleeve on the shaft D in the direction indicated, for instance, by the arrow at Fig. 5 will slightly depress the free end of arm $f$ and force shaft $e^2$ (to which the other end of arm $f$ is rigidly secured) to rock or slightly turn on its axis, thus causing the arm $d$, fast on the outer end of shaft $e^2$, to move sufficiently to act on the projection $n$ of the hub of trip-lever $a$ and operate it in the desired manner.

The sleeve-piece $h$ is caused to slide on shaft D in the direction of the arrow at Fig. 5 under circumstances and by the means I will now explain, and is returned always to its normal position by a strong spiral spring, $m$.

On the hub or collar portion $e$ of the chain-wheel E are arranged at points diametrically opposite two little radially-projecting studs, 1, on which are mounted anti-friction rollers 2, and these rollers 2 are accommodated in cavities or cut-outs made in opposite portions of the thimble-like part of sleeve $h$, as clearly shown. These cut-outs have inclined or cam-shaped surfaces at 3 3, along which the rollers 2 have a tendency to ride, as they operate, clutch-like, to rotate said sleeve. This tendency is overcome by the pressure endwise against the opposite end of sleeve $h$ of the strong spring $m$, and hence so long as a given resistance only is offered to the turning of sleeve $h$ by the rollers 2, seated in the cut-outs referred to, said rollers will act to simply clutch the hub $e$ of wheel E to the sleeve $h$ and rotate the latter with said hub, (and since sleeve $h$, by reason of pin $s$ and slot $t$, cannot turn on shaft D, the latter is duly rotated also;) but whenever a greater degree of resistance to the turning of sleeve $h$ is offered than that mentioned, then the rollers 2 will ride up the cam-like faces 3 of the cut-outs, thus forcing the sleeve $h$ in the direction indicated by the arrow at Fig. 5 and producing the effect already explained. Now, as the first work done by the shaft D is the driving of the packers B B, it will be clear that by making (or adjusting) the capacity of the spring so that it will yield to the tendency of sleeve H to slide only when the resistance offered to the packers shall have become so great as to represent the maximum compression of the grain in the gavel-receptacle necessary to form a given-sized sheaf, the sleeve $h$ will slide only under that condition of facts, and that thus the tripping device will be operated only at the desired time.

It will be seen that with a machine made according to my present invention the binder devices will certainly be thrown into operation and the gavel bound and discharged whenever a sufficient quantity of grain shall have been packed into the said receptacle with the predetermined pressure, irrespective of whether the packed grain shall have been properly forced into contact with the fingers I, that are designed to co-operate with the needle-arm, or shall have (improperly) gotten wedged hard between the upper and lower sides or surfaces of the gavel-receptacle, as it is liable to sometimes do; that therefore all liability of any clogging, stoppage, unnecessary and hurtful strain on the machine, or undue work by or strain on the team are effectually avoided, for the moment the packers begin to work harder than they should prior to the requisite compressing-force for a full-sized sheaf this burden on the drive-wheel E, which, through its yielding clutch-like devices, is driving the shaft D and its packers B B, will cause the sleeve $h$ to be shipped endwise and the binder devices proper and sheaf-discharging devices to be set into operation to bind up and discharge in a sheaf the collected and duly-compressed mass of grain.

It will be understood that the gist of my invention rests in an organization such that the pressure existing between the batch of grain being compacted in the gavel-receptacle and a device or devices operating to pass it down into said receptacle shall operate to actuate the devices or mechanism for tripping into action the sheaf binding and discharging mechanisms, in contradistinction to all previous organizations made on the principle of utilizing the pressure of the collected mass on some device toward and against which the incoming grain had to be carried, and it will be seen that this novel feature of construction of the type of self-binders to which my invention relates may be carried out in other forms than that shown.

I have shown that mode of carrying out the broad invention made by me which I have thus far devised and put into practical operation successfully, and which is well adapted to the form of machine (of the type alluded to) that I have heretofore devised and am putting into very general use; but I desire to be understood as considering the scope of my invention as covering not only the particular means shown for transmitting the undue pressure on the arm or arms (that force the grain down into the gavel-receptacle) to the tripping device, but also any organization of devices in which the described novel principle of construction may be embodied—i. e., a construction in which the tripping device or the means employed to throw the driving mechanism into action on the binder devices proper shall be operated from the arms or device which presses the grain down into the gavel-receptacle.

All subject-matter shown in the drawings and described in the specification not pertaining to the particular form of packing and tripping device herein claimed, and such other matters as are described and claimed in any other pending application filed by me, are hereby disclaimed in this case; and What I herein claim as new, and desire to secure by Letters Patent, is—

1. In a machine in which the grain is collected and compressed within a gavel-receptacle by the action of a packing arm or arms, the combination, with said gavel-receptacle and said packing arm or arms, of tripping mechanism for throwing the binder devices periodically into operation, actuated by said arm or arms whenever the latter meet with such degree of resistance as will prevent them from traveling farther in the path of their packing movement in packing the grain into said receptacle, substantially as set forth.

2. In a machine of the described type, the combination, with the packing arm or arms and the trip-lever, of an intermediate mechanism for causing the said arm or arms to actuate the said lever, composed essentially of a drive-wheel mounted loosely on the drive-shaft of said arm or arms, a sliding clutch device mounted to slide on said shaft, and held in close working relation with the said wheel by a spring, and the means for communicating the sliding movement of said clutch device to the trip-lever, all substantially as hereinbefore set forth.

In testimony whereof I have hereunto set my hand this 17th day of November, 1881.

JOHN F. APPLEBY.

In presence of—
 JACOB FELBEL,
 A. TOUG.